T. VARNEY.
TROLLEY HANGER.
APPLICATION FILED JULY 8, 1909.
946,625.
Patented Jan. 18, 1910.
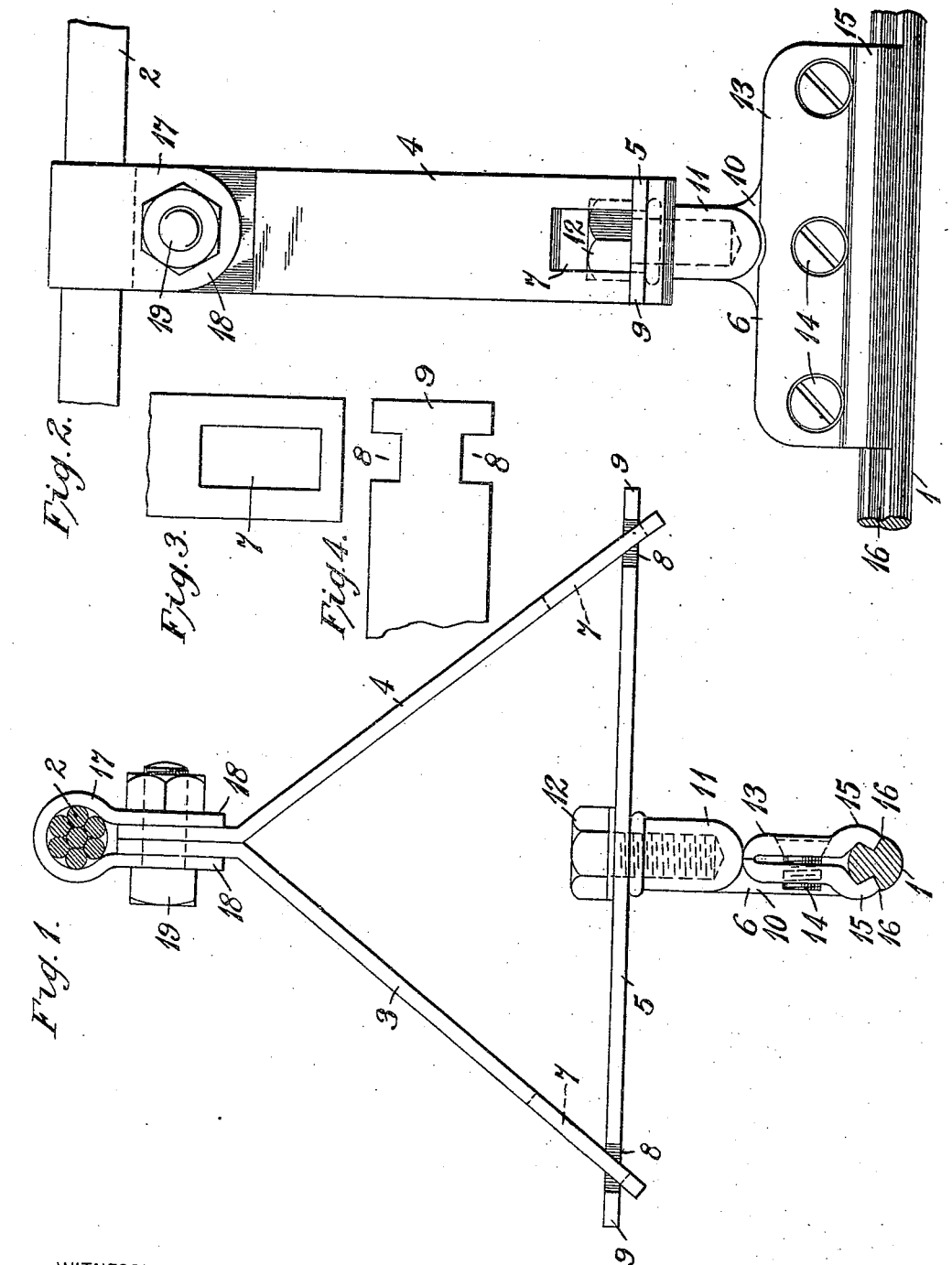
WITNESSES:
Fred H Miller
R J Earborn
INVENTOR
Theodore Varney
BY
Wiley G Carr
ATTORNEY

UNITED STATES PATENT OFFICE.

THEODORE VARNEY, OF PITTSBURG, PENNSYLVANIA, ASSIGNOR TO WESTINGHOUSE ELECTRIC AND MANUFACTURING COMPANY, A CORPORATION OF PENNSYLVANIA.

TROLLEY-HANGER.

946,625. Specification of Letters Patent. Patented Jan. 18, 1910.

Application filed July 8, 1909. Serial No. 506,638.

*To all whom it may concern:*

Be it known that I, THEODORE VARNEY, a citizen of the United States, and a resident of Pittsburg, in the county of Allegheny and State of Pennsylvania, have invented a new and useful Improvement in Trolley-Hangers, of which the following is a specification.

My invention relates to means for suspending electric trolley conductors, and it has for its object to provide a simple and durable structure which shall be specially adapted for suspending a trolley conductor from a single messenger wire or cable and which shall permit of a limited adjustment of the trolley conductor relative to the messenger wire and have sufficient rigidity to prevent any material lateral movement of the trolley conductor.

When a trolley wire is suspended from two messenger wires or cables, or, when two trolley conductors are suspended from one or more messenger wires or cables, it is evident that a certain amount of lost motion may be introduced into the connection between the trolley clamp and the suspension structure without any liability for the trolley conductor to be laterally displaced to any considerable extent. It is my aim to provide such a structure that substantially the same conditions will exist when only a single trolley conductor is suspended from a single messenger wire or cable as has heretofore existed when a plurality of trolley wires or messenger cables have been provided.

Figures 1 and 2 of the accompanying drawings are, respectively, a front and side elevation of a suspension structure embodying my invention, and Figs. 3 and 4 are detail views of the structure shown in Figs. 1 and 2.

Referring to the drawings, a trolley wire 1 is suspended from a messenger wire or cable 2 by means of a triangular structure comprising two side bars 3 and 4 which are clamped together and to the messenger cable at their upper ends and diverge as they extend downwardly, and a cross bar 5 which is loosely supported from the side bars and carries a trolley clamp 6 which is secured to its middle point and depends therefrom.

The lower extremities of the side bars 3 and 4 are provided with recesses 7 and the ends of the cross bar are provided with notches 8 which form T-shaped end projections 9 for insertion in the recesses 7. The recesses 7 are of considerable length, to permit relative movement between the trolley conductor 1 and the messenger wire 2, but it is obvious from Fig. 1 of the drawings that only a slight lateral displacement of the trolley conductor can take place.

The trolley clamp 6 may be of any suitable form and comprises, as shown, a jaw member 10 having a boss 11 projecting upwardly therefrom which is drilled and tapped to receive a bolt 12 projecting downwardly through a hole in the cross bar 5, and a second jaw member 13 which is clamped to the jaw member 10 by means of screws 14. The jaw members are provided with hooked projections 15 which are adapted to engage longitudinal grooves 16 in the trolley conductor.

In order to permit of a longitudinal adjustment of the trolley conductor relative to the messenger cable, the upper extremities of the side bars 3 and 4 are preferably secured to the messenger cable by means of a looped clip 17 having downwardly projecting ears 18, a bolt 19 being thrust through the ears and the upper ends of the bars after the clip has been placed in position on the messenger cable.

I claim as my invention:

1. A hanger for electric conductors comprising a conductor clamp, an overhead support and a triangular structure interposed between the two parts and having one side loosely secured to the other two.

2. A hanger for electric conductors comprising a conductor clamp, an overhead support, an inverted V-shaped structure depending from an overhead support, a cross rod or bar adjustably secured to the inverted V-shaped structure and a conductor clamp dependent from the cross bar.

3. A hanger for electric conductors comprising a messenger wire or cable, an inverted V-shaped structure dependent therefrom, a cross rod or bar adjustably secured to the extremities of the V-shaped structure, and a conductor clamp secured to the middle point of the cross bar and projecting downwardly therefrom, the plane of the inverted V-shaped structure being substantially perpendicular to the center line of the conductor.

In testimony whereof, I have hereunto subscribed my name this 29th day of June, 1909.

THEODORE VARNEY.

Witnesses:
WILLIAM SCHAAKE,
B. B. HINES.